(12) United States Patent
Miehl et al.

(10) Patent No.: US 10,341,752 B2
(45) Date of Patent: Jul. 2, 2019

(54) REMOVABLE CARTRIDGE FOR INSERTION INTO PORTABLE COMMUNICATIONS DEVICE

(71) Applicant: MOTOROLA SOLUTIONS, INC., Chicago, IL (US)

(72) Inventors: Andrew P. Miehl, Boca Raton, FL (US); Deborah A. Gruenhagen, Southwest Ranches, FL (US); Ryan M. Nilsen, Plantation, FL (US); Jorge L. Garcia, Plantation, FL (US); Vance McGary, Miami, FL (US)

(73) Assignee: MOTOROLA SOLUTIONS, Chicago, IL (US)

( * ) Notice: Subject to any disclaimer, the term of this patent is extended or adjusted under 35 U.S.C. 154(b) by 5 days.

(21) Appl. No.: 15/702,030

(22) Filed: Sep. 12, 2017

(65) Prior Publication Data
US 2019/0082245 A1 Mar. 14, 2019

(51) Int. Cl.
*H04R 1/02* (2006.01)
*H04M 1/03* (2006.01)
*H04R 1/28* (2006.01)

(52) U.S. Cl.
CPC ............. *H04R 1/025* (2013.01); *H04M 1/03* (2013.01); *H04R 1/2803* (2013.01); *H04R 2201/003* (2013.01); *H04R 2499/15* (2013.01)

(58) Field of Classification Search
CPC ............. H04R 1/025; H04R 1/2803; H04R 2201/003; H04R 2499/15; H04M 1/03
USPC ................... 381/87, 386, 332–336
See application file for complete search history.

(56) References Cited

U.S. PATENT DOCUMENTS

| | | | | |
|---|---|---|---|---|
| 2009/0245565 A1* | 10/2009 | Mittleman | ............ | H04M 1/035 381/365 |
| 2011/0255726 A1* | 10/2011 | Yu | .......................... | H04R 1/025 381/332 |
| 2012/0134518 A1* | 5/2012 | Otani | ..................... | H04R 1/023 381/189 |

OTHER PUBLICATIONS

Motorola Solutions, "APX 7000 Multiband Portable Radio, The First Choice of First Responders," product spec sheet (2012) pp. 1-4.
Motorola Solutions, "APX 6000 Single-Band Portable Radio," product data sheet (2016) 8 pages.
Motorola Solutions, "XE500 Fire RSM Model 1," software release notes (2016) pp. 1-9.
Motorola Solutions, "APX XE500 Ultimate Usability, Extreme Performance," brochure (2017) 4 pages.

* cited by examiner

*Primary Examiner* — Ahmad F. Matar
*Assistant Examiner* — Sabrina Diaz
(74) *Attorney, Agent, or Firm* — Michael Best & Friedrich LLP

(57) ABSTRACT

A removable cartridge for a portable communication device. The removable cartridge includes frame having a first surface, and an opposite second surface. The second surface is non-planar and is shaped to conform to a shape of a speaker cone in the portable communications device. The removable cartridge also includes a membrane coupled to the first surface of the frame. A portion of the membrane is suspended over an open gap defined by the frame.

5 Claims, 5 Drawing Sheets

REMOVABLE CARTRIDGE FOR INSERTION INTO PORTABLE COMMUNICATIONS DEVICE

BACKGROUND OF THE INVENTION

Portable communications devices commonly include a loudspeaker system for providing audio communications to a user. The loudspeaker system includes a speaker cone within a housing of the portable communications device, and a speaker bezel disposed along the housing of the portable communications device. Acoustic performance of the loudspeaker system depends upon factors such as the amount of air gap present between the speaker cone and bezel, as well as the amount of debris that may have accumulated adjacent the speaker cone.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
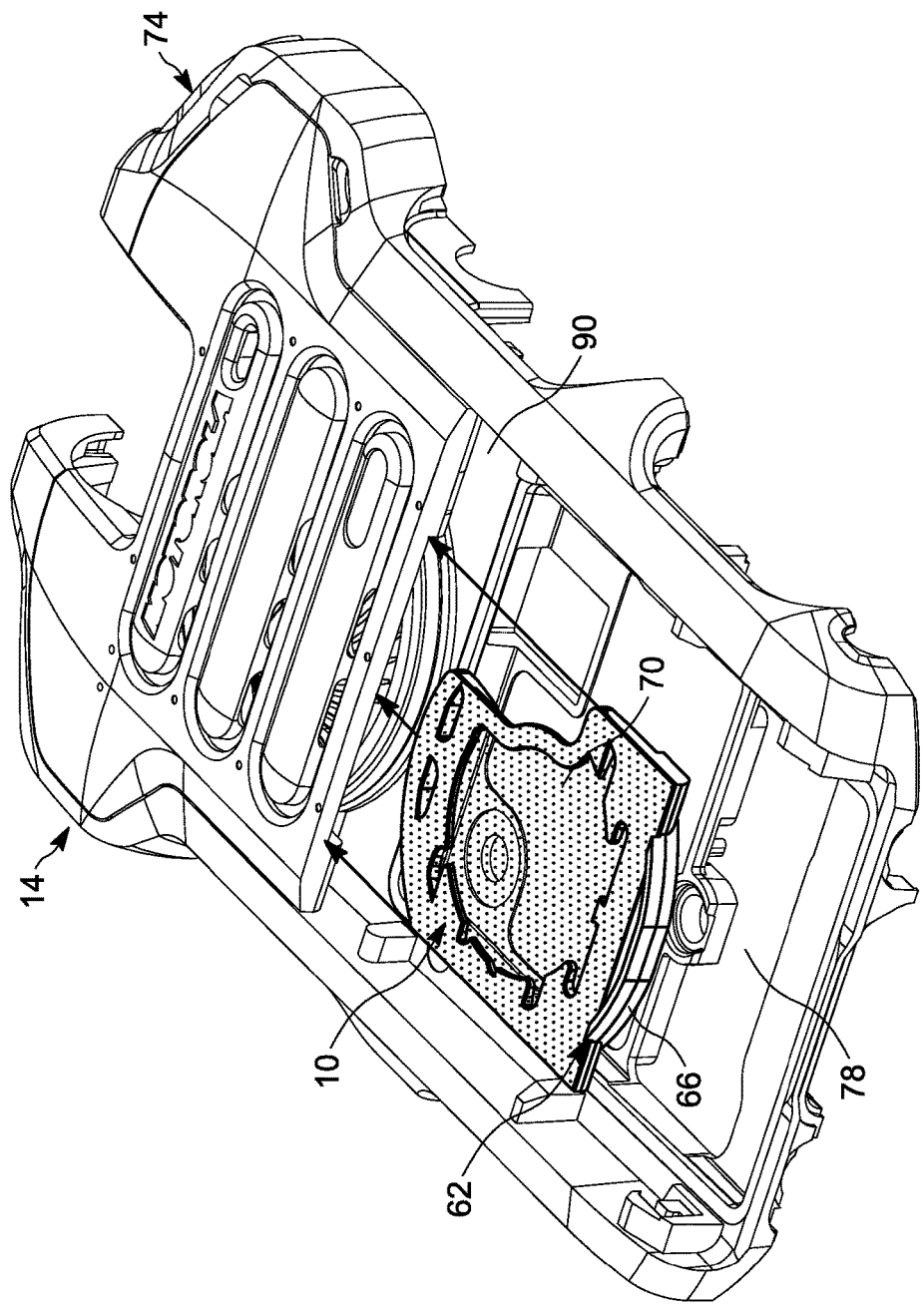
FIG. 1 illustrates a removable cartridge for insertion into a portable communications device in accordance with one embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a removable cartridge for insertion into a portable communication device. In one example, the removable cartridge includes frame having a first surface, and an opposite second surface. The second surface is shaped to conform to a shape that corresponds to that of a maximum excursion of a speaker cone in the portable communications device. The removable cartridge also includes a membrane coupled to the first surface of the frame.

Another embodiment provides a portable communications device. In one example, the portable communications device includes a housing, a speaker cone disposed within the housing, and a frame having first and second surfaces, wherein the first surface is planar and the second surface is non-planar and spaced from the speaker cone. An open gap extends between the first and second surfaces, and a membrane is coupled to the first surface of the frame. A portion of the membrane is suspended over the open gap.

Another embodiment provides a removable cartridge for a portable communications device. In one example, the removable cartridge includes a frame having a first surface, and an opposite second surface. The frame has a first thickness extending between the first and second surfaces at an outer periphery of the frame and a second thickness extending between the first and second surfaces at an inner periphery of the frame. The first thickness is greater than the second thickness. The frame defines an open gap. The removable cartridge includes a membrane coupled to the frame. A portion of the membrane is suspended over the open gap.

FIGS. 1-5 illustrate a removable cartridge 10 for insertion into a portable communications device 14. The portable communications device 14 may be one of a variety of different types of portable communications devices 14, including a handheld phone, a two-way radio receiver/transmitter, and the like. In some embodiments, the portable communications device 14 may be used by firefighters, police officers, medical personnel, and/or others to receive and transmit communications.

Figure 2:
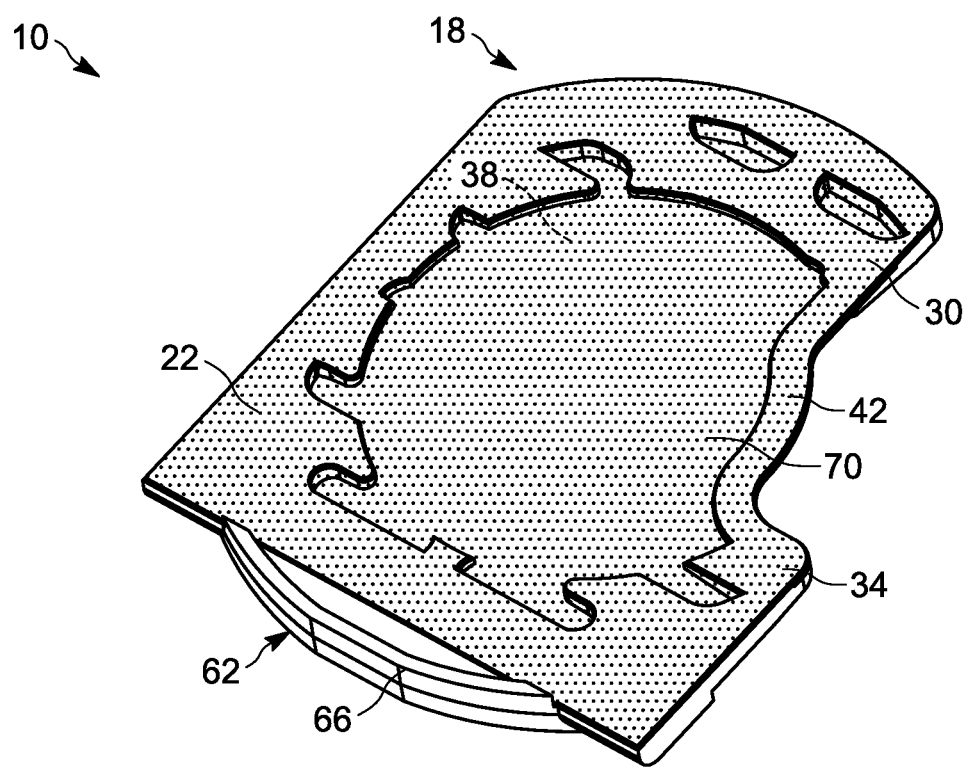
FIG. 2 illustrates a first, upper surface of the removable cartridge, and a membrane coupled to the upper surface.
Figure 3:
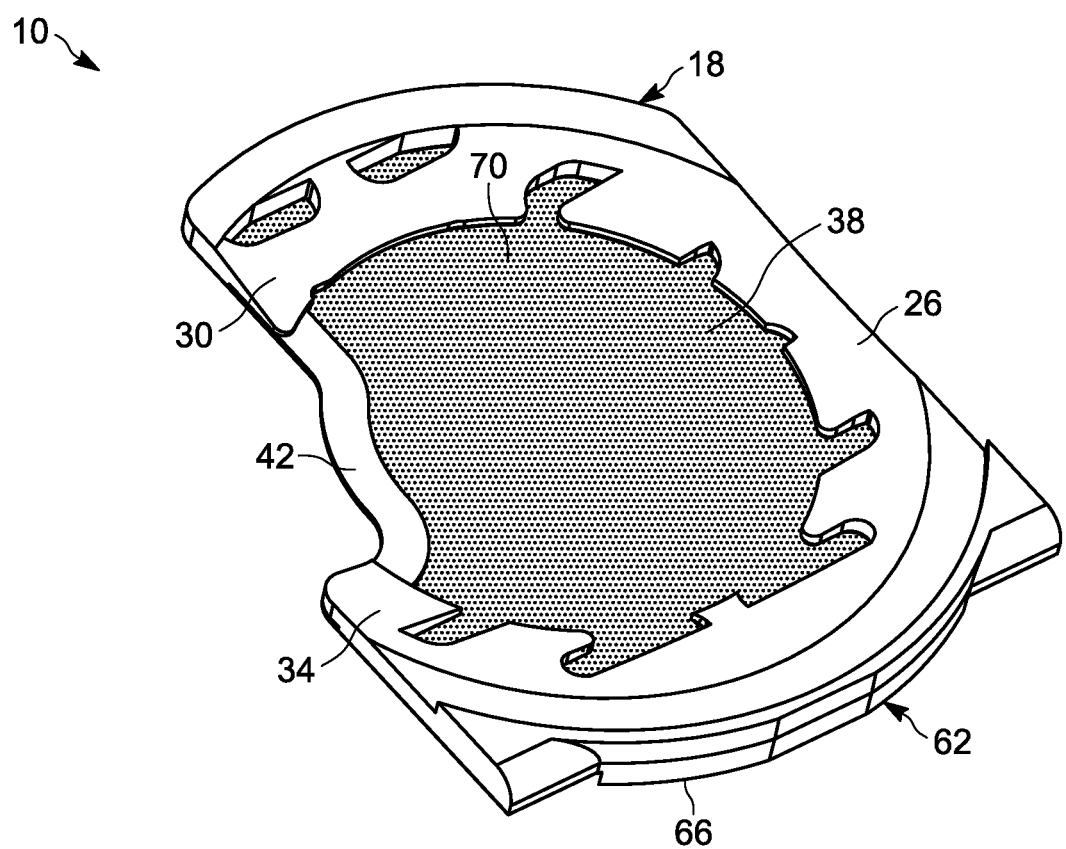
FIG. 3 illustrates a second, lower surface of the removable cartridge.
Figure 4:
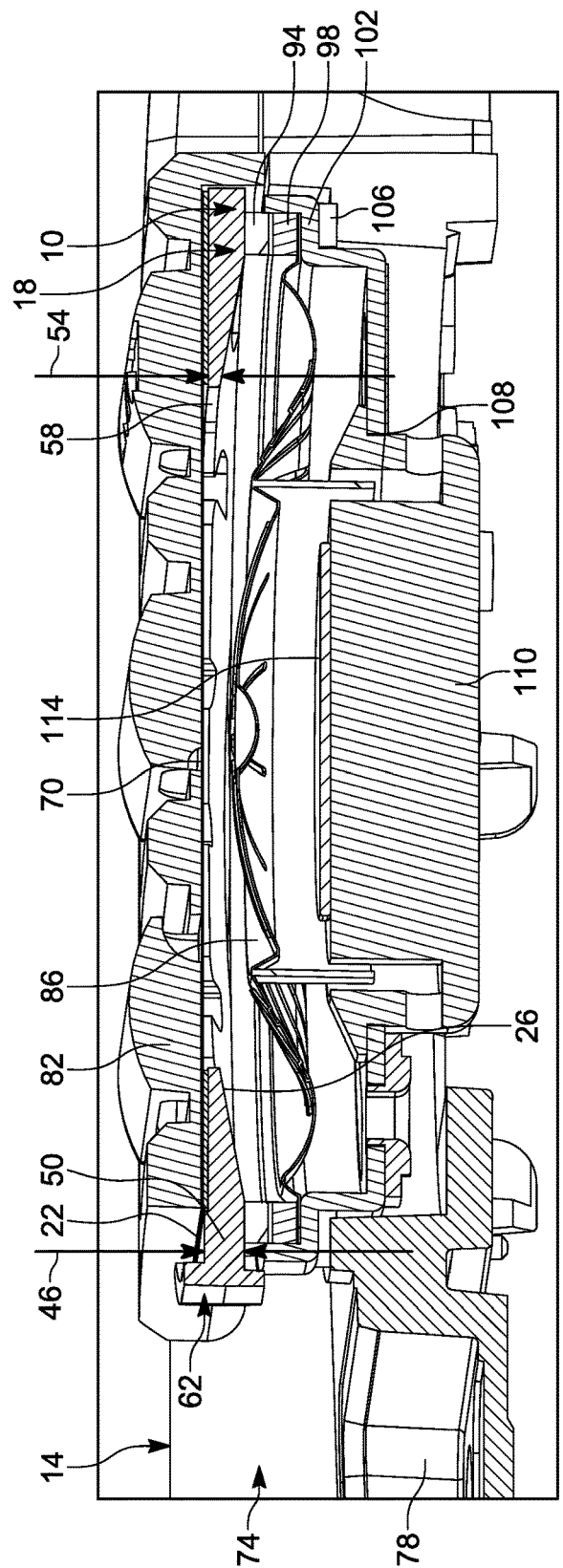
FIG. 4 illustrates a cross-sectional view of the removable cartridge and portable communications device, after insertion of the removable cartridge into the portable communications device.

With reference to FIGS. 2-4, the removable cartridge 10 includes a frame 18 having a first, upper surface 22 and a second, lower surface 26. The upper surface 22 is disposed opposite the lower surface 26. In the illustrated embodiment, the upper surface 22 is planar, and the lower surface 26 is non-planar, with at least a portion of the lower surface 26 forming the shape of a dome. The frame 18 overall forms a C-shaped, plastic (for example injection-molded) structure having a first end 30 and a second end 34, with an open gap 38 defined by the frame 18 that extends between portions of the frame 18 and between the upper surface 22 and the lower surface 26. In the illustrated embodiment a strip of insert-molded sheet metal 42 (or other material) extends between the first and second ends 30, 34 of the frame 18, thereby fully enclosing the open gap 38. Other embodiments include different shapes, surfaces, and structures than that illustrated for the frame 18. For example, in some embodiments both the upper surface 22 and the lower surface 26 may be non-planar, the non-planar lower surface 26 may have a shape other than that of a dome, and/or the frame 18 overall may have a shape other than a C-shape (for example a D-shape, U-shape, fully-enclosed O-shape, and the like). In some embodiments, the frame 18 may be comprised of a material other than plastic (for example metal, or a combination of metal and plastic). Additionally, in some embodiments the strip of sheet metal 42 (or other suitable material) may not be provided, and the open gap 38 may not be fully enclosed or may not be needed (for example when a fully-enclosed O-shape is provided).

With reference to FIG. 4, the frame 18 has a first thickness 46 extending between the upper and lower surfaces 22, 26 at an outer periphery 50 of the frame 18, and a second thickness 54 extending between the first and second surfaces 22, 26 at an inner periphery 58 of the frame 18. The first thickness 46 is greater than the second thickness 54. In some embodiments, the second thickness 54 is approximately zero, or approaches zero, due to the shape of the lower surface 26. Other embodiments include different thicknesses than that illustrated.

With reference to FIGS. 1-4, the frame 18 also includes a finger grip 62 that includes a projection 66 extending from the upper surface 22 that is sized and shaped to be gripped by a finger to facilitate sliding the removable cartridge 10 into the portable communications device 14. In the illustrated embodiment the projection 66 has an arcuate shape. Other embodiments may include different shapes for the projection 66 (for example square-shaped), as well as different locations for the projection 66. In some embodiments, the finger grip 62 may include a plurality of projections 66, for example forming a set of ridges to be gripped by a user's finger. In some embodiments, the finger grip 62 allows the removable cartridge 10 to be inserted into and removed from the portable communications device 14 without the use of a tool.

With reference to FIGS. 1-5, the removable cartridge 10 further includes a membrane 70 coupled to the frame 18. In the illustrated embodiment the membrane 70 is a planar, meshed membrane 70 coupled (for example directly with pressure sensitive adhesive) to the first upper surface 22. As illustrated in FIGS. 1-5, a portion of the membrane 70 is suspended above the open gap 38. In other embodiments the membrane 70 may be non-planar, and/or made of a material other than a mesh material (for example a solid, non-permeable membrane 70 may be used that may vibrate to transmit sound waves from a speaker cone, and may be thus be spaced far enough from a bezel to allow room for vibration). In the illustrated embodiment the membrane 70 comprises a woven polyester (or nylon) material, although in other embodiments the membrane 70 may be a metal material, or a combination of metal and non-metal material. In some embodiments, a hydrophobic coating may further be applied over one or more surfaces of the membrane 70. In some embodiments, the open gap 38 is not provided, and the membrane 70 extends over and is fully supported by the frame 18. The membrane 70 may have a larger thickness at an outer periphery and a smaller thickness at a center of the membrane 70 and/or frame 18.

Figure 5:
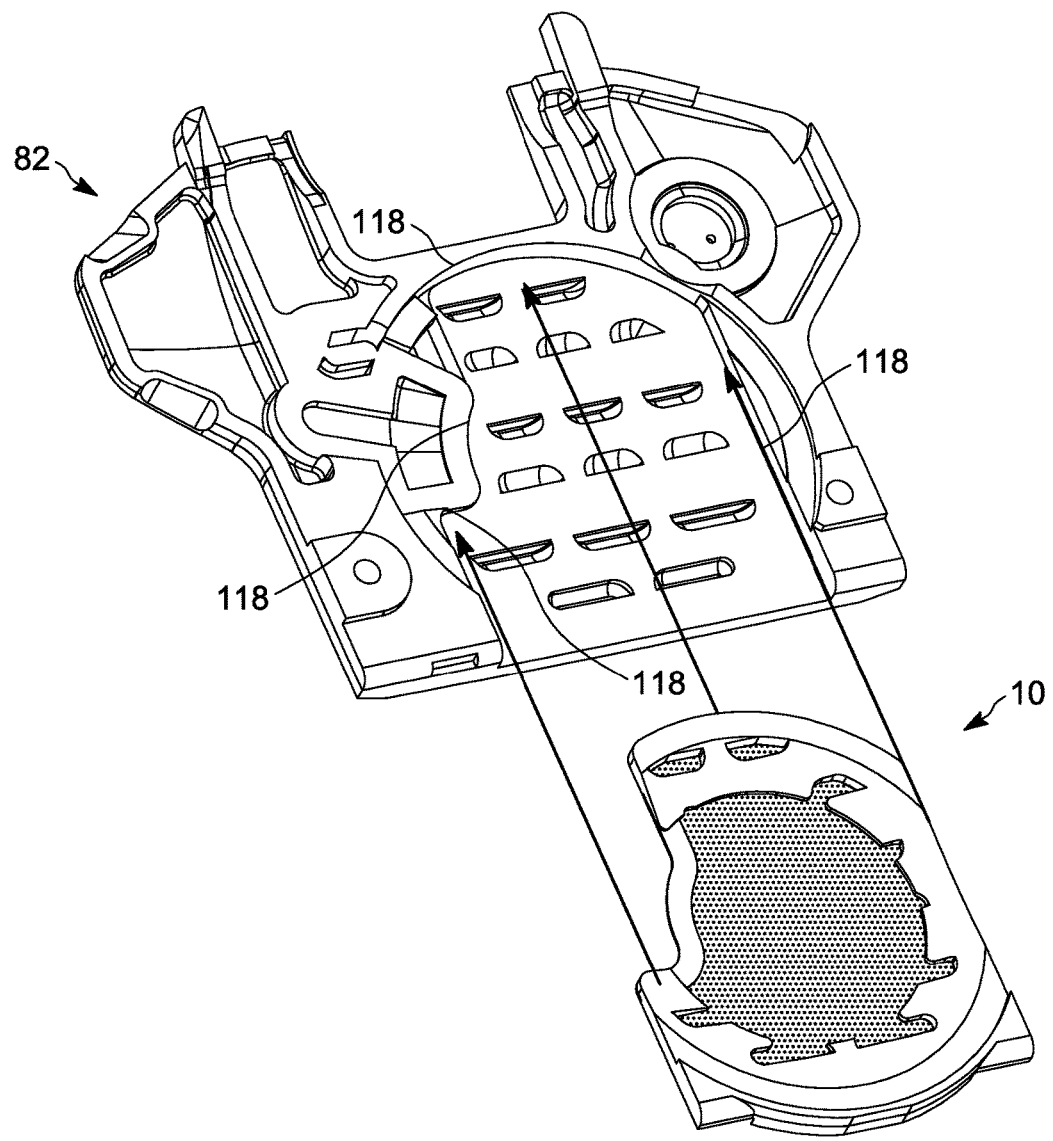
FIG. 5 illustrates a speaker bezel of the portable communications device, and the removable cartridge aligned with the speaker bezel.

With reference to FIGS. 1, 4, and 5, the portable communications device 14 includes a housing 74. As illustrated in FIG. 1, the housing 74 defines a battery compartment 78. A cover (not illustrated) may be removed to provide access to the battery compartment 78. Once the cover is removed, the removable cartridge 10 may be inserted into or removed from the portable communications device 14.

With continued reference to FIGS. 4 and 5, the housing 74 includes a speaker bezel 82 (for example a rigid, plastic speaker bezel having openings for emission of sound out of the portable communications device 14). A speaker cone 86 is disposed within the housing 74 below the speaker bezel 82, and is spaced from the speaker bezel 82. As illustrated in FIG. 1, the battery compartment 78 defines an opening 90 for receipt of the removable cartridge 10 into the space between the speaker cone 86 and the speaker bezel 82. Once the removable cartridge 10 is inserted into the portable communications device 14 and into the battery compartment 78, the removable cartridge 10 may then be extended (for example pushed or slid) through the opening 90 and into the space between the speaker cone 86 and the speaker bezel 82. In other embodiments, the speaker bezel 82 may be hinged, or otherwise pivotable away from a remainder of the housing 74, to provide access for insertion of the removable cartridge 10.

With reference to FIG. 4, when the removable cartridge 10 is fully inserted, the finger grip 62 remains outside of the space between the speaker cone 86 and the speaker bezel 82, such that the removable cartridge 10 may easily be gripped and pulled out of the portable communications device 14 (for example to be washed and cleaned, repaired, and/or replaced with a different removable cartridge 10). In some embodiments, a modular system of removable cartridges 10 may be provided, wherein each of the removable cartridges 10 is identical, or wherein one of the removable cartridges 10 may include a first type of membrane 70 (for example of a first material or mesh pattern), and another of the removable cartridges 10 may include a different type of membrane 70 (for example of a different material or mesh pattern).

With continued reference to FIG. 4, in the illustrated embodiment when the removable cartridge 10 is fully inserted, the removable cartridge 10 is held in place by friction. For example, a portion of the frame 18 having the first thickness 46 sits upon (and thus directly contacts) an acoustic seal ring 94. The acoustic seal ring 94 sits upon a compliant pad 98, which sits upon a speaker basket 102. The speaker basket 102 sits upon a speaker water seal 106, which provides a seal between the speaker basket 102 and the housing 74.

The speaker basket 102 defines a central opening 108 for receipt of a magnetic assembly 110 that includes a yoke, magnet, and pole plate. A portion of the magnetic assembly 110 sits upon the speaker basket 102. The magnetic assembly includes a gauss bucker 114. As illustrated in FIG. 4, the speaker cone 86 surrounds a portion of the magnetic assembly 110 and extends to the speaker basket 102 and the compliant pad 98. In some embodiments, the speaker cone 86 defines a speaker diaphragm with a voice coil.

With continued reference to FIG. 4, the upper surface 22 of the frame 18, along with the membrane 70, are positioned in close proximity (for example within one millimeter, within two millimeters, within three millimeters, within four millimeters, and the like) to the speaker bezel 82. The membrane 70 is positioned in close proximity to, but still spaced from, the speaker cone 86 when the speaker cone 86 is fully extended. The membrane 70 is positioned to accumulate debris during use of the portable communications device 14. Thus, when the membrane 70 has accumulated a significant amount of debris, and/or once a predetermined time period has passed, the removable cartridge 10 may be removed, and a new, clean removable cartridge 10 may be inserted. Alternatively, the removable cartridge 10 may be removed and washed or otherwise cleaned (for example removing ferrous debris that otherwise is attracted to a magnetic field generated within the portable communications device 14), before being inserted back into the portable communications device 14.

With continued reference to FIG. 4, the lower surface 26 of the frame 18 is spaced from and faces the speaker cone 86. The lower surface 26 of the frame 18 has a shape that corresponds in close proximity to, but is still spaced from, a maximum excursion of the speaker cone 86. For example, in the illustrated embodiment the speaker cone 86 has a dome shape that corresponds to the dome shape of the lower surface 26, such that an air gap between the frame 18 and the speaker cone 86 remains minimized at all points along the frame 18. This minimized gap reduces an air volume between the speaker cone 86 and the speaker bezel 82, thereby improving acoustic performance of the portable communications device 14.

With reference to FIGS. 4 and 5, when the removable cartridge 10 is initially inserted into the space between the speaker cone 86 and the speaker bezel 82, one or more portions of the frame 18 may contact the speaker cone 86, thus pressing the speaker cone 86 down in a direction toward the magnetic assembly 110, prior to the removable cartridge 10 being fully inserted. This contact and movement of the speaker cone 86 may be facilitated for example by the strip of sheet metal 42, or by the frame 18 itself. The insertion of the removable cartridge 10 may also be facilitated by structural features on the speaker bezel 82 itself. For example, as illustrated in FIG. 5, the speaker bezel 82 may include one or more guide surfaces 118 that are shaped to correspond to outer surfaces of the frame 18, thus helping to align and guide the frame 18 into the space between the speaker cone 86 and the speaker bezel 82. Other embodiments include guide surfaces 118 having different shapes and features than that illustrated, as well as guide surfaces 118 that define rails, channels, or other features to facilitate guiding and/or holding the removable cartridge 10 in place once inserted.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A portable communications device comprising:
   a housing;
   a speaker cone disposed within the housing;
   a frame having first and second surfaces, wherein the first surface is planar and the second surface is non-planar and spaced from the speaker cone;
   an open gap extending between the first and second surfaces of the frame; and
   a membrane coupled to the first surface of the frame, wherein a portion of the membrane is suspended over the open gap;
   wherein the housing includes a battery compartment, and wherein the battery compartment defines an opening for receipt of the frame and membrane.

2. The portable communications device of claim 1, wherein the second surface of the frame has a shape that conforms to a shape of the speaker cone.

3. The portable communications device of claim 1, wherein the housing includes a speaker bezel, wherein the frame and membrane are sized and shaped to be extended through the opening and positioned between the speaker bezel and the speaker cone.

4. The portable communications device of claim 3, further comprising an acoustic seal ring that surrounds the speaker cone, wherein a portion of the frame is configured to directly contact the acoustic seal ring.

5. The portable communications device of claim 1, wherein the frame includes a first thickness extending between the first and second surfaces at an outer periphery of the frame and a second thickness extending between the first and second surfaces at an inner periphery of the frame, wherein the first thickness is greater than the second thickness, and wherein the second surface is configured to face the speaker cone.

* * * * *